July 9, 1935.  J. B. COBLE  2,007,295
VEHICLE BODY
Filed Jan. 6, 1933  5 Sheets-Sheet 3

INVENTOR.
John B Coble
BY
ATTORNEYS

July 9, 1935.   J. B. COBLE   2,007,295
VEHICLE BODY
Filed Jan. 6, 1933   5 Sheets-Sheet 4

INVENTOR.
John B Coble
BY
ATTORNEYS

July 9, 1935.  J. B. COBLE  2,007,295
VEHICLE BODY
Filed Jan. 6, 1933   5 Sheets-Sheet 5
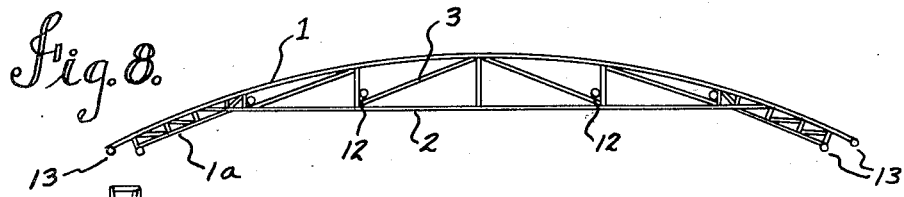
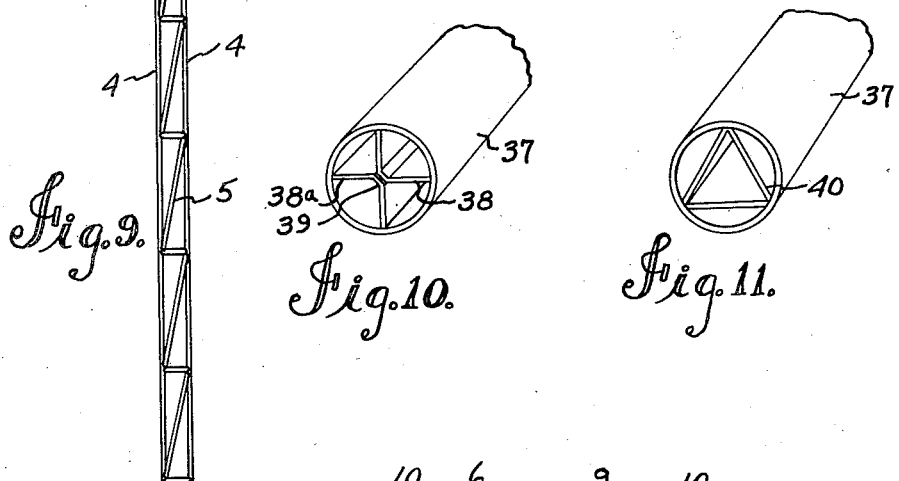
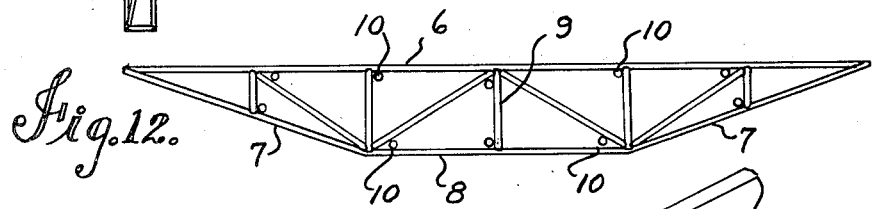
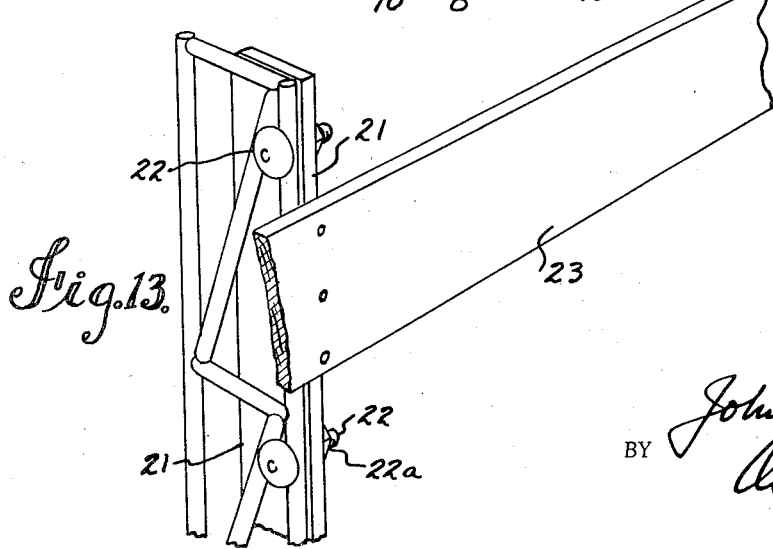
INVENTOR.
John B Coble
BY
ATTORNEYS Patented July 9, 1935

2,007,295

UNITED STATES PATENT OFFICE 2,007,295

VEHICLE BODY

John B. Coble, Alexandria, Ky., assignor of one-fourth to Fred J. Rittinger, one-fourth to Worth W. Whitaker, and one-fourth to Edward A. Rittinger, all of Alexandria, Ky.

Application January 6, 1933, Serial No. 650,489

1 Claim. (Cl. 296—28)

My invention relates to bodies for motor vehicles and more particularly, as illustrated, for a refrigerator or insulated body for commercial motor vehicles.

It is my object to construct a body which is of much less weight than the present refrigerator truck bodies, such as are required for use in the long distance transporting of milk to the market. Specifically it is my object to make a vehicle body formed of a metallic frame work of metal tubing welded together and so arranged as to form a support to an inner covering and an outer covering.

The outer covering which I prefer to employ is made of airplane cloth, and the inner covering of wood. In connection with the inner covering, I provide for means for mounting furring strips to which a wooden inner wall can be secured in any desired manner. The outer covering can readily be sewed in place and anchored to the frame work as a part of the sewing.

My invention includes the use of internally reinforced tubing which makes a very strong and yet light weight metallic frame member for vehicles, and I regard as novel, as such.

My invention includes further the use of electric welding to unite the tubing of which the frame work is built in such a way as to make it one integral structure.

The structure of the frame work is such that each element transverse and lengthwise of the said frame is a truss, and also the united trusses are braced as units or sections by diagonally extending members.

There is provided by my invention, a skeleton frame to be secured to the body itself which surrounds the cab of the vehicle, thus giving a finish to its appearance, this frame being covered, and functioning as a nose which is readily detachable from the body, and is an adjunct thereto.

Various features of my invention are applicable to vehicle bodies in general, and the particular embodiment of my invention which is illustrated and described is intended as an example of my invention. The general principles inherent in the structure to be described, and the inventive combinations of which the embodiment is an illustration will be set forth in the appended claim.

In the drawings, Fig. 1 is a side elevation of a vehicle constructed according to my invention.

Fig. 8 is an elevation of a roof truss.

Fig. 9 is an elevation of a wall truss.

Fig. 10 is a perspective showing one of the reinforced tubes used in portions of the frame work.

Fig. 11 is a modification of the form shown in Fig. 10.

Fig. 12 is an elevation of a floor truss.

Fig. 13 is a perspective illustrating the mode of mounting the furring strips for the internal lining of the vehicle.

Figure 1:
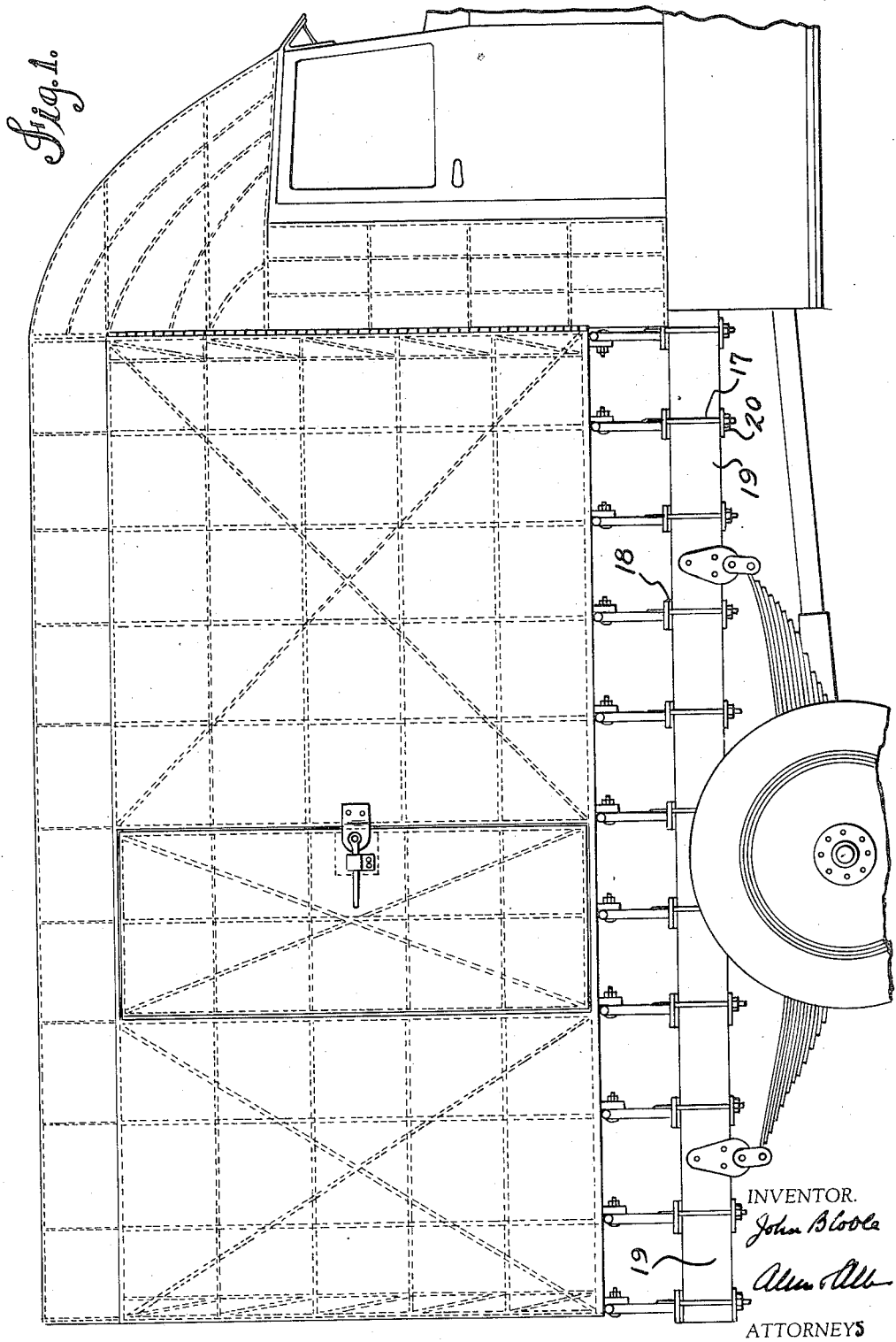

Referring first to the general structure of the vehicle body, as already noted, it is formed of a series of united trusses, with the whole welded together to form a unit, the roof trusses, (Fig. 8), are formed of assembled light metal tubing with a main bent tube 1, and cross member 2, with intervening tubes 3, and with tubes 1$a$ parallelling the outer ends of the tubes 1. The wall trusses (Fig. 9), are formed of vertical tubes 4, 4, with cross members 5. The floor trusses (Fig. 12) are formed of heavier tubing and have straight tubes 6, slanting terminal tubes 7, 7 and a shorter bottom tube 8, with interventing members 9.

These various truss members are to be made up as shown and welded together.

Figure 2:
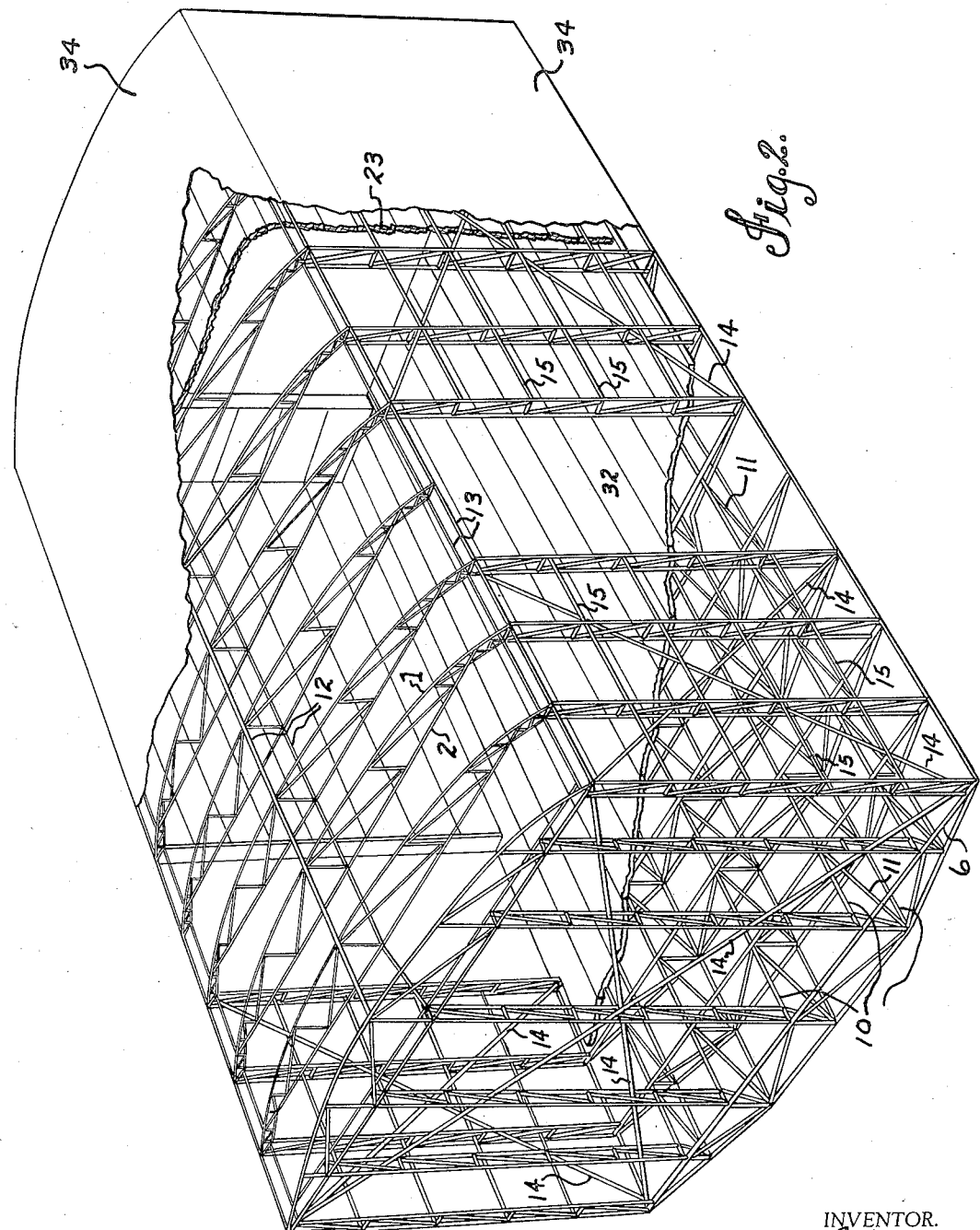
Fig. 2 is a perspective of the frame work thereof.

In building up the vehicle frame, there will be a jig provided to hold the series of floor trusses, lengthwise connecting tubes 10, will be laid over the lower tubes 8, and also will be arranged underneath the top tubes 6 (Fig. 12) and (Fig. 2). The whole will then be welded into a unit, with the lengthwise tubes welded preferably to the intervening tubes and arranged at their junctures with the top and bottom tubes. Diagonal tubes 11 are installed at the same time as the lengthwise tubes, so that the whole welding job is done at once. These diagonal tubes form trusses with the lengthwise tubes 10.

In forming the roof of the structure the same procedure is followed, the trusses being arranged in a jig and the lengthwise tubes 12 installed and the whole welded together. The introduction of diagonal trussing members for the lengthwise tubes 12 is not necessary.

Although it may be desired to make up the wall sections of the frame in panels and then unite them with the roof and base sections, I have not illustrated this in my drawings. In making the side walls, front and rear of the frame, the roof section and the floor or base section are properly interspaced and the walls built between them.

Lengthwise tubes 13, are welded to the ends of the roof trusses as part of its original structure. The wall truss units are arranged with their wider dimension extending inwardly of the body, and welded at the top to the tubes 13, 13, of which there are a pair at each side of the roof. The wall trusses are also welded to the top members 6 of the floor trusses. Diagonal tubular braces 14 are arranged in sets at the front, rear, and the two sections (interspaced by door openings) at the sides, and welded in place, and lengthwise members 15, may be employed for interconnecting the side wall members to the extent desired. I have only employed these at the portions of the walls which define the sides of the vehicle because here the doors are to be supported.

Figure 4:
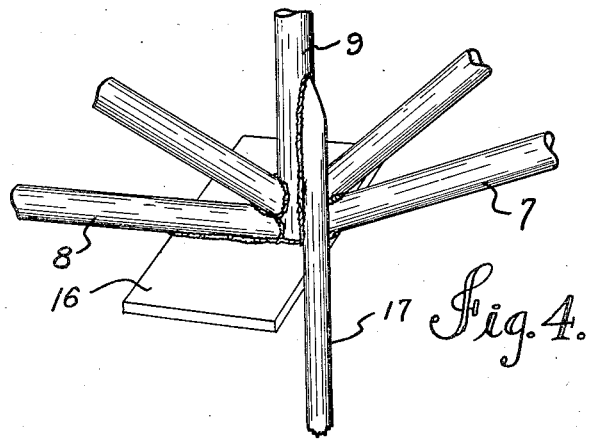
Fig. 4 is a perspective illustrating the welding together of the assembled frame tubes and the attaching bolt for securing the body on the vehicle chassis.
Figure 5:
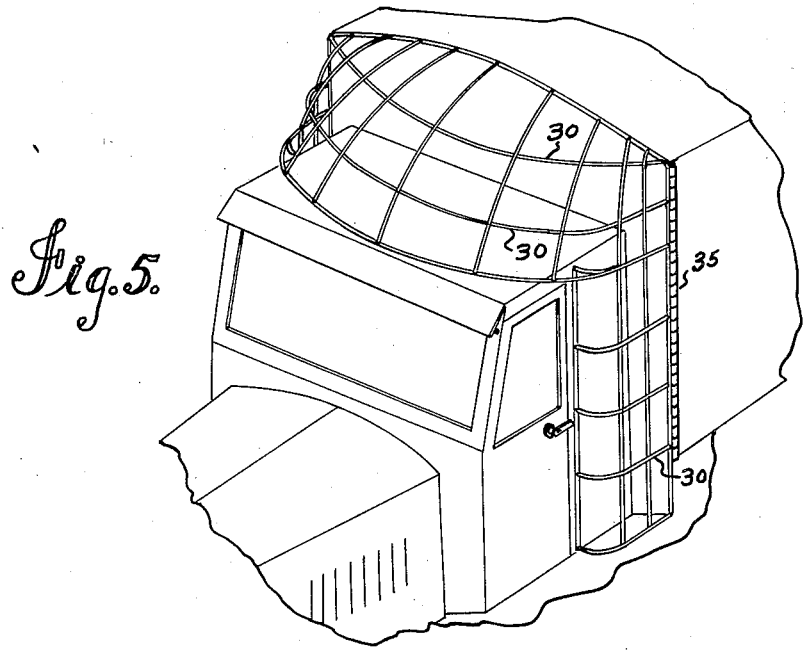
Fig. 5 is a perspective of the cab and the body nose thereabout.

For securing the body frame to the chassis of the motor vehicle, I secure plates 16, Fig. 4, at each floor truss, where the bottom tubes 8 thereof terminate, and weld these plates to the several tubes of the frame members that come together at that point. Also welded to the plates and to the assembly of tubes and extending down through the plate, is a bolt 17 for each plate.

Figure 3:
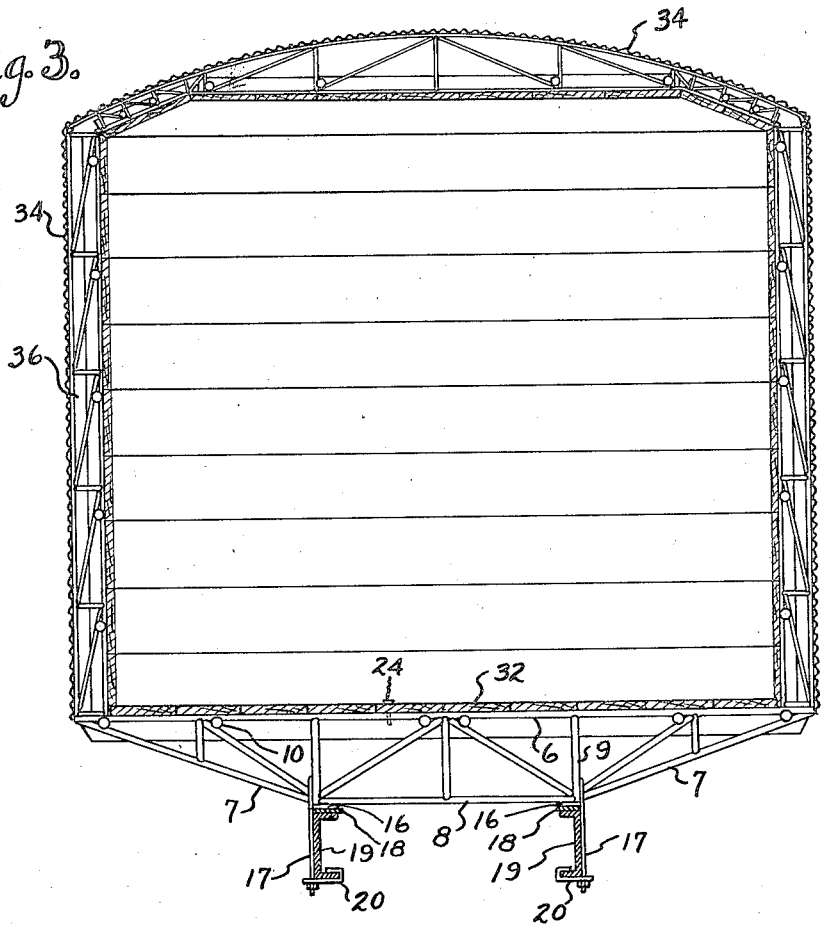
Fig. 3 is a vertical cross section thereof, taken on section line $a$—$a$ of Fig. 1.

In mounting the body on the chassis I place a rubber cushion 18, (Fig. 3), under each plate where it will rest on the lengthwise member or bed 19, of the frame, and I equip the lower end of the bolt with a hook plate 20 which engages around the lower flange of the frame member 19. Nuts on the ends of the bolts hold the hook plates tightly in place, and force the body down tightly against the chassis frame members.

In providing for the inner lining of the vehicle I provide furring strips 21 (Fig. 13), which are bolted by bolts 22 to the wall trusses, the bolts being thrust through crotches between the vertical and intervening members. The furring strips are held in place by nuts 22a on the ends of the bolts where they protrude through the furring strips. The boards 23 forming the inner lining of the body are then nailed to the edges of the furring strips that lie a little further than flush with the inside tubes of the wall trusses. The floor boards 32 are preferably held down on the floor trusses by means of hook bolts which hook over the top members of the floor trusses and pass through the floor board. I have indicated such a bolt at 24 in Fig. 3.

Figure 6:
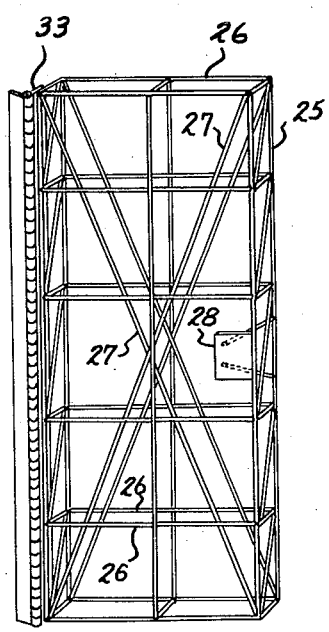
Fig. 6 is a perspective view of the structure and mounting of one of the doors.
Figure 7:
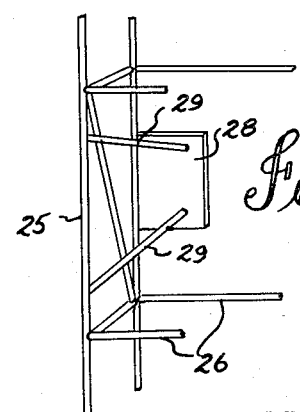
Fig. 7 is a detail perspective showing the mounting of the door lock plate.

The doors (Fig. 6) are made up like the side walls of vertical truss members 25, with transverse tubes 26, this time in pairs, and cross tubes 27, the whole welded together into a unit. A long piano type hinge plate 33 is secured to each door, and a like hinge plate 33a secured to the adjacent side wall frame portion, again by welding, so that a long pintle may be inserted to hold the doors in place. Lock plates 28 are secured to the side wall section opposite the hinge plates, preferably reinforced by a series of trussing tubes 29 welded to the plates and to the frame tubes forming the wall truss located at the opening.

In covering the outside of the frame so constructed, airplane cloth 34 is applied, stretched in the same manner as making up an airplane wing, and sewed to the frame members and sewed together after which paint may be applied as desired.

At the front of the body, I provide a piano hinge plate 35 for securing the nose in place. The nose is made up of light tubes 30 bent and secured together by welding with hinge plates along the sides welded in place. This permits of the nose being secured in place by long pintles, and permits the removal of the nose. The nose will naturally be made to fit down over whatever cab is employed with the vehicle, and will be covered with airplane cloth.

The body so formed has a dead air space 36 of considerable volume which provides ample insulation for the body. A refrigerating apparatus may be placed inside of the vehicle for maintaining a low temperature therein when this is desired.

The body is very light as compared with present refrigerator bodies for motor vehicles, and is attractive in appearance. It is very strong being trussed in all directions, and its mounting on the vehicle chassis is simple and very secure.

For the tubular portions of the heavier parts of the body frame I will preferably use types such as are illustrated in Figs. 10 and 11. These consist of metal tubes 37 into which have been thrust metal sections which fill them and make trusses of them. In Fig. 10 the internal truss is formed of two angle strips 38, 38a, welded along the spaces 39 of the angle. In Fig. 11 the internal truss element is formed of a triangular piece 40, in cross section. Either form I find highly desirable for its lightness and strength. This form of tubular frame elements is quite desirable for any type of vehicle body construction, and I believe it to be novel with me.

It will be evident that while adhering to the principle of the structure now described, fully trussed bodies of tubular elements can be built up and united by welding into a single unit, by using different shapes and arrangements.

Having thus described my invention, what I claim as new and desire to secure by Letters Patent, is:—

In a vehicle body with double side walls, a floor and a roof, a frame comprising vertical side wall trusses, each made up of an inner and an outer vertical member, cross members connecting the vertical members and diagonal braces connecting the junctions of the vertical and cross members, all of said members being rigidly joined together at their meeting portions, trusses connecting respective pairs of side wall trusses across the top and bottom of the frame, said trusses being rigidly secured together at their meeting portions, and longitudinal frame members connecting the several sets of vertical, top and bottom trusses at the junctions of the trusses, and rigidly secured to said trusses, said frame also including a minimum amount of diagonal bracing between vertical trusses and deriving the major portion of its rigidity against transverse weaving from the truss formation of the vertical side walls members, and the major portion of its rigidity against longitudinal weaving from the connection of the sets of trusses by the longitudinal frame members, and the vertical side wall trusses serving to space inner and outer side wall layers to form a hollow side wall with a minimum of contained structural parts, for the purposes set forth.

JOHN B. COBLE.